Feb. 28, 1967 H. M. BECK 3,307,169

CATHODE RAY TUBE DISPLAY OF SHIFT REGISTER CONTENT

Filed Jan. 30, 1963

INVENTOR.
HUGO M. BECK
BY Blair R. Studebaker Agent
Richard C. Reed
ATTORNEY

United States Patent Office 3,307,169

Patented Feb. 28, 1967

3,307,169
CATHODE RAY TUBE DISPLAY OF SHIFT REGISTER CONTENT

Hugo M. Beck, Oxon Hill, Md., assignor to the United States of America as represented by the Secretary of the Navy Filed Jan. 30, 1963, Ser. No. 255,134
3 Claims. (Cl. 340—324)

Figure 1:
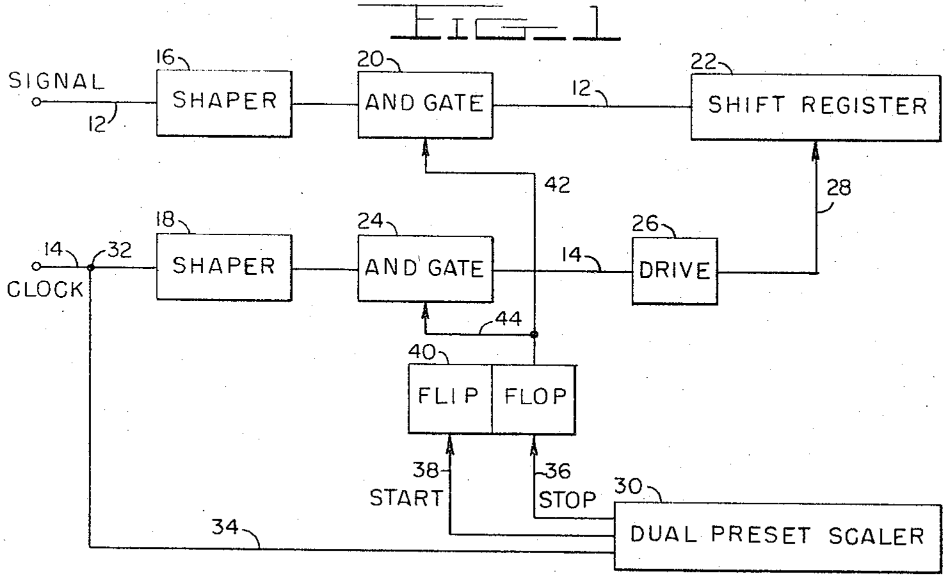

The invention described herein may be manufactured and used by or for the Government of the United States of America for governmental purposes without the payment of any royalties thereon or therefor.

This invention relates to a digital memory oscilloscope and more particularly to a digital memory oscilloscope employing miniature cathode ray indicators on each bit of a transistorized shift register.

Great difficulty has been encountered in attempting to check out digital switching systems for accuracy of signal and for locating the point of error occurrence. This problem particularly arises in networks or devices such as teletype multiplexers, computers, or in telemetering. Digital systems employing neon type indicators have proved inadequate due to their less than instantaneous response to the information signal, variations in extinction and firing voltages required by the different indicators and the tendency of such indicators to flicker. Substantial limiting difficulties also occur with filament type indicators. Conventional oscilloscopes also are considered inadequate for these purposes due to difficulties in interpretation and use and restrictions as to length of memory. Conventional oscilloscopes are particularly inadequate where it is desired to read a relatively slow moving signal without completely stopping signal reception. The reason for such inadequacy stems directly from the continuous line type signal manifestation common to all conventional oscilloscopes.

The digital memory oscilloscope of the present invention provides a convenient and satisfactory device for permitting observation of sequential binary information occurring in some order in switching networks or devices such as teletype multiplexers, computers or in telemetering without any of the inherent difficulties of present signal verification devices. In this device the signal being observed is clearly and instantaneously manifested on a plurality of miniature cathode ray indicators representing each bit on a binary shift register.

An object of the present invention is the provision of a transistorized device for checking digital switching systems.

Another object of the present invention is to provide a device wherein information passing through a binary digital system is faithfully and instantaneously reproduced.

A further object of the invention is the provision of a system whereby a portion of the sequential binary information in a digital switching system may be selectively visually reproduced.

A still further object of the invention is to provide a stopped or snap shot manifestation of a selected sequence of information occurring in a switching network.

Still another object is to provide a device whereby slow moving binary information may be directly observed and interpreted while moving.

Other objects and features of the present invention will be readily apparent to those skilled in the art when the following detailed description is considered in conjunction with the accompanying drawing in which:

FIG. 1 is a schematic drawing of the present invention; and

Figure 2:
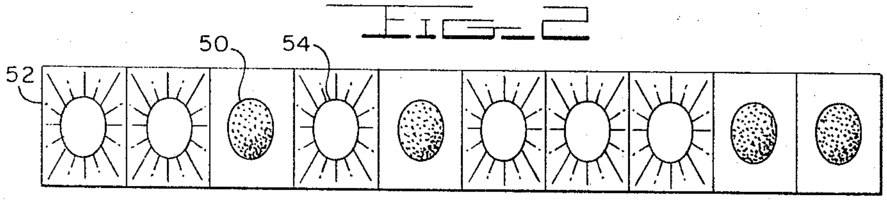
Figure 3:
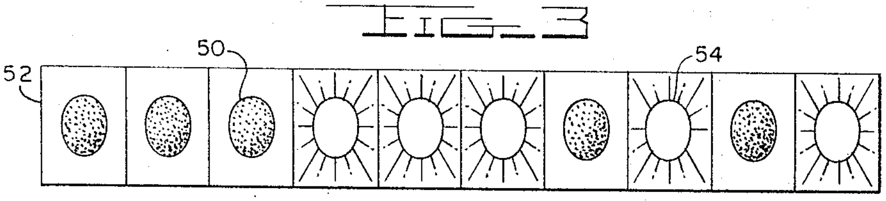
Figure 4:
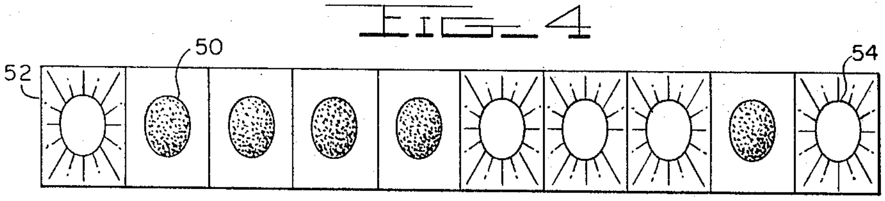

FIGS. 2, 3, and 4 represent the indicating bank of a ten bit shift register which has been stopped after 8, 12, and 14 clock pulses, respectively.

Referring now in detail to the drawings, wherein like reference numerals designate like parts, and more particularly, to FIG. 1, there is shown a schematic of the binary memory oscilloscope of the present invention including input line or circuit 12 carrying the sequential binary information signal and input line or circuit 14 carrying the clock pulses. Shapers 16 and 18, of the amplitude quantitizing circuit type, are disposed respectively in each of input lines 12 and 14. The information signal line 12 continues from shaper 16 through conventional "and" gate 20 to a conventional transistorized flip flop shift register 22.

The clock pulse input line 14 continues from shaper 18 through a second "and" gate 24 to drive circuit 26 which is a standard drive circuit for a transistorized flip flop shift register. The output of drive circuit 26 is connected directly to shift register 22 by line or circuit 28.

The input of a dual preset scaler 30 is connected, as at 32, to the clock input 14 by a transmission line 34. A pair of output lines 36 and 38 connect the scaler 30 to flip flop 40 which is in turn connected to "and" gates 20 and 24 by lines 42 and 44, respectively, to control the opening and closing of said "and" gates.

Each bit of the transistorized shift register 22 is connected, in the preferred embodiment, to a Philips type 6977 cathode ray indicator 50 to provide a bank of miniature signal lights as represented in FIGS. 2, 3, and 4. It will be appreciated, however, that any type of miniature cathode ray indicator can be employed without departing from the scope of the present invention. Although a bank of ten indicators is shown in each of FIGS. 2, 3, and 4, it will be further appreciated that one of the attendant advantages of the binary memory oscilloscope of the instant invention is that there is no limit to the length of sequential binary information that can be stored and the shift register could well include 100, 1000, 10,000, or an even larger number of cathode ray indicators 50.

In operation, "and" gates 20 and 24 are initially closed, signal and clock pulses are received in lines 12 and 14, respectively, travel through shapers 16 and 18 and are stopped, respectively, at "and" gates 20 and 24. For each input signal there is necessarily a related clock pulse, however, these clock pulses do not necessarily have to be of a constant frequency. The clock pulses are additionally transmitted through line 34 to the dual preset scaler 30 which will, after receiving a preselected number of clock pulses, transmit a first trigger pulse or start signal to flip flop 40 through line 38. Upon reception of the start signal or pulse from scaler 30 flip flop 40 transmits a synchronized gating signal through lines 42 and 44 to "and" gates 20 and 24, respectively, actuating said gates to permit the passage therethrough of the binary information and clock signals.

The clock signal after passing through "and" gate 24 actuates drive circuit 26 to cause a shift of one digit in shift register 22 with each clock pulse received. Since the clock pulses and the information signals are related, with each shift of the register a new condition of operation will be received by the first bi-stable circuit of the shift register and the condition of operation of each succeeding circuit will be shifted to the adjacent bi-stable circuit.

For an understanding of the observable operation of the digital memory oscilloscope of the present invention, attention is directed to FIGS. 2, 3, and 4 wherein reference character 52 represents a bank of ten miniature cathode ray tubes 50 of the transistorized flip flop shift register 22. Initially the ten tubes 50 will be unlighted.

When "and" gate 20 is actuated to permit the information signal to pass, shift register 22 will begin to display that signal sequentially. FIG. 2 represents the register after reception of eight signals with the fifth signal indicated at 54. FIG. 3 represents the register after reception of twelve signals and showing the fifth signal 54 to have moved four bits to the right. FIG. 4 represents the register after reception of fourteen signals and it should be noted that the first four signals have dropped off since only a ten digit memory is desired in this embodiment. Upon reception of the fifteenth signal the fifth signal 54 will also drop off. It is to be understood that the use of a ten bit register is for purposes of illustration only and a memory of unlimited length is within the scope of the present invention.

Returning now to the operation of the device, after a second preselected number of clock pulses are received by the scaler 30 subsequent to its activation of flip flop 40, scaler 30 will transmit a second trigger or stop pulse to flip flop 40 through line 36. Upon reception of this stop pulse flip flop 40 will cease to transmit the gating signal to "and" gates 20 and 24 thus closing the gates and blocking the passage of signal and clock pulses to shift register 22. At this point the order of the sequential binary information on shift register 22 can be read and compared to that which the switching system being checked should put out. It will be readily appreciated that if the information being observed is traveling at a slow rate of speed, stopping of the oscilloscope will not be necessary in order to check the order of the binary information flowing through the system.

It should be further noted that although only a single trace oscilloscope has been shown and described it would not be necessary to depart from the principles of the present invention in order to provide a multiple trace oscilloscope. Merely providing additional "and" gates 20, operable in response to the gating pulse from flip flop 40, and shift registers 22 for each additional trace desired would suffice.

It is apparent from the foregoing that the digital memory oscilloscope of the present invention provides a clear and instantaneous manifestation of sequential binary information occurring in switching networks such as teletype multiplexers, computers, or in telemetering and permits the retention of such information by a memory of substantially unlimited length.

Obviously many modifications and variations of the present invention are possible in the light of the above teachings. It is therefore to be understood that the scope of this invention is to be limited only by the appended claims and not otherwise.

What is claimed is:

1. A digital memory oscilloscope for electronically reproducing the sequential binary information passing through a switching network comprising an information signal input circuit, a clock signal input circuit, first gating means in said information input circuit, second gating means in said clock input circuit, said first and second gating means controlling passage of signals through said respective input circuits, control means responsive to preselected numbers of clock pulses for selectively opening and closing said first and second gating means simultaneously, a shift register connected to receive the information signal from said first gating means and the clock a plurality of miniature cathode ray indicators one signal from said second gating means, and a plurality of miniature cathode ray indicators one each on each bit of said shift register for instantaneously manifesting the binary information passing through said switching network.

2. A digital memory oscilloscope for electronically reproducing the sequential binary information passing through a switching network comprising an information signal input circuit, a clock signal input circuit, first gating means in said information input circuit, second gating means in said clock input circuit, said first and second gating means controlling passage of signals through said respective input circuits, control means responsive to preselected numbers of clock pulses for selectively opening and closing said first and second gating means simultaneously, a transistorized flip flop shift register connected to receive the information signal from said first gating means, a drive circuit connected to receive the clock signal from said second gating means and adapted to sequentially drive said shift register, and each on each bit of said shift register for instantaneously manifesting the binary information passing through said shift register.

3. A digital memory oscilloscope for electronically reproducing the sequential binary information passing through a switching network comprising an information signal input circuit, a clock signal input circuit, a first "and" gate in said information input circuit, a second "and" gate in said clock input circuit, said first and second "and" gates controlling the passage of signals through said respective input circuits, a dual preset scaler and flip flop connected for selectively opening and closing said first and second "and" gates simultaneously in response to preselected numbers of clock pulses, a transistorized flip flop shift register connected to receive the information signal from said first "and" gate, a drive circuit connected to receive the clock signal from said second "and" gate and adapted to sequentially step drive said shift register, and a plurality of miniature cathode ray indicators one each on each bit of said shift register for instantaneously manifesting the binary information passing through said shift register.

References Cited by the Examiner

UNITED STATES PATENTS

| | | | |
|---|---|---|---|
| 2,767,908 | 10/1956 | Thomas | 340—324.1 |
| 2,840,311 | 6/1958 | Magnuson et al. | 235—92 |
| 2,869,000 | 1/1959 | Bruce | 235—92 |
| 3,021,450 | 2/1962 | Jiu | 235—92 |
| 3,100,850 | 8/1963 | McMillian et al. | 235—92 |

NEIL C. READ, *Primary Examiner.*

H. I. PITTS, *Assistant Examiner.*